United States Patent
Lasser et al.

(10) Patent No.: US 8,077,413 B2
(45) Date of Patent: Dec. 13, 2011

(54) ADJUSTABLE PINHOLE FOR A LASER SCANNING MICROSCOPE

(75) Inventors: Theo Lasser, St. Prex (CH); Antonio Lopez, Renens (CH); Thomas Sidler, Cossonay (CH); Sebastian Favre, La Chaux-de-Fonds (CH); Ronald Gianotti, Echichens (CH)

(73) Assignee: Carl Zeiss MicroImaging GmbH, Jena (DE)

( * ) Notice: Subject to any disclaimer, the term of this patent is extended or adjusted under 35 U.S.C. 154(b) by 876 days.

(21) Appl. No.: 10/557,903

(22) PCT Filed: Apr. 28, 2004

(86) PCT No.: PCT/EP2004/004498
§ 371 (c)(1),
(2), (4) Date: Apr. 5, 2007

(87) PCT Pub. No.: WO2004/104647
PCT Pub. Date: Dec. 2, 2004

(65) Prior Publication Data
US 2007/0285813 A1     Dec. 13, 2007

(30) Foreign Application Priority Data
May 22, 2003   (DE) .................................. 103 23 922

(51) Int. Cl.
*G02B 27/00* (2006.01)
*G02B 5/00* (2006.01)
(52) U.S. Cl. ......... 359/894; 359/385; 359/896; 348/373
(58) Field of Classification Search ............... 359/894, 359/385, 738, 739, 232; 348/373; 396/235; 250/492.23
See application file for complete search history.

(56) References Cited

U.S. PATENT DOCUMENTS

| | | | |
|---|---|---|---|
| 2,964,998 A | 12/1960 | Middlestadt | |
| 3,717,401 A | 2/1973 | Powell | |
| 4,017,162 A | 4/1977 | Mills | |
| 4,047,808 A | 9/1977 | Bartlett | |
| 4,907,027 A * | 3/1990 | Kobe et al. | 396/235 |
| 5,206,765 A | 4/1993 | Traeger | |
| 6,392,703 B1 * | 5/2002 | Uchino et al. | 348/373 |
| 6,643,061 B2 * | 11/2003 | Osa et al. | 359/385 |
| 2003/0184882 A1 | 10/2003 | Engelhardt | |

FOREIGN PATENT DOCUMENTS

| | | |
|---|---|---|
| DE | 4212077 C2 | 10/1993 |
| EP | 0 280 375 A | 8/1988 |
| EP | 0 628 796 A1 | 12/1994 |

(Continued)

*Primary Examiner* — Audrey Y Chang
(74) *Attorney, Agent, or Firm* — Jacobson Holman PLLC

(57) ABSTRACT

An adjustable pinhole, in particular for a beam path for illumination and/or detection in a laser-scanning microscope. The pinhole consists of at least two planar basic modules, which have frame-like joints, on which at least one blade is arranged in a displaceable manner in one direction, whereby the basic component advantageously contains at least one integrated, preferably optical or electromagnetic actuator. A device is provided at the blade, or connected with it, for preferably optical or electromagnetic detection of the position, and is provided, advantageously, with two asymmetric apertures, with mutually opposite orientation, for optical detection of the position, whereby in front of or behind the apertures, a slit is provided, oriented preferably at a right angle to the direction of displacement, and the quantity of light passing through the slit is detected separately for each aperture.

8 Claims, 4 Drawing Sheets

| | FOREIGN PATENT DOCUMENTS | | |
|---|---|---|---|
| JP | 61 082649 A | 4/1986 | |
| JP | 11 02928 A | 4/1989 | |
| JP | 11 16618 A | 5/1989 | |

| JP | 06 194230 A | 7/1994 |
|---|---|---|
| JP | 09 159935 A | 6/1997 |
| JP | 91 59935 A | 6/1997 |

* cited by examiner

ADJUSTABLE PINHOLE FOR A LASER SCANNING MICROSCOPE

CROSS REFERENCE TO RELATED APPLICATIONS

The present patent application is a nationalization of International Application No. PCT/EP2004/004498, filed Apr. 28, 2004, which is based on, and claims priority from, German Application No. DE 103 23 922 A1, filed May 22, 2003, both of which are incorporated herein by reference in their entireties.

BACKGROUND OF THE INVENTION

1. Field of the Invention

The present invention relates to adjustable pinholes for use in laser scanning microscopes.

2. Related Art

A scissors-like shutter mechanism for a pinhole has been described in U.S. Patent Application 2003/0184882 A1, published on Oct. 2, 2003.

In such mechanisms, above all, the accuracy at the sites of the angles, which lie mutually opposite and which must move about an axis of rotation, poses a serious problem in the fabrication of pinhole apertures with reproducible and light-tight shutting and exact quadratic form.

The problem lies in the fabrication of high-precision pinholes which can shut in a light-tight manner, and whose apertures exhibit a quadratic form from size zero onwards.

SUMMARY OF THE INVENTION

The special advantages of the present invention lie in the quasi-monolithic and very flat design with a "sandwich" style of construction, whereby, according to the invention, the optical position measurement unit can also be integrated directly into it.

Regulation of the pinhole position can be done with a closed measurement circuit without hysteresis effects.

The invention can be realized with a number of materials, among others, with silicon wafer material. Thus, an already miniaturized design can be miniaturized even further.

Energy consumption for the actuation is low.

Production costs are very low.

The basic module consists of at least one monolithic planar structure, which comprises at least one blade, located therein, and held by elastic joints, and preferably containing at least two triangles, situated in a fixed spatial relationship with mutually opposite orientation, which serve the purpose of controlling the position (Optical Position Measurement Unit OPM).

Further, the position control comprises flat structures, preferably of the same material as that used in the basic modules, which include small sources of light (for example LEDs) or receivers with adapted dimensions, and are plugged in the sandwich structure of the basic modules. Further details about the function of the OPM will be presented in the following description.

The blades of the basic modules are parallel to each other and can be angled, so as to achieve better closure.

The mechanical arrangement of the integrated mobile elements, preferably a parallelogram attachment in this case, ensures parallelism of both of the edges of the blades, which are mutually displaceable.

The movement of the blades takes place by means of miniaturized magnetic actuators, preferably, but not exclusively, of a moving magnet type, whereby, within an electrical coil, one or more permanent magnets, or a different type of electromagnetic actuator, are arranged in a displaceable manner.

Thereby, it is of advantage, if the magnetic actuators are arranged on the same planar structure as the blades and move the blades.

The coupling of the movable blades with the optical position measuring units enables a manipulation of the blades by means of a closed control circuit.

With a pinhole according to the invention, at least the following specifications can be realized:

apertures with a 3-300 μm diameter;
a drift-free movement range of +/−300 μm;
reproducibility of the position and a blade opening less than 500 nm;
compact build in an area smaller than 50×50×20 nm;
an edge accuracy smaller than 0.8 μm;
a high degree of stiffness of the blades (small axial overlap error);
independence of the wavelength within the range of at least 350-800 nm, as well as in IR and UV range; and
a set-up time less than one second.

BRIEF DESCRIPTION OF THE DRAWINGS

In the following, the invention is described in detail on the basis of the schematic diagrams.

DETAILED DESCRIPTION OF THE INVENTION

Figure 1:
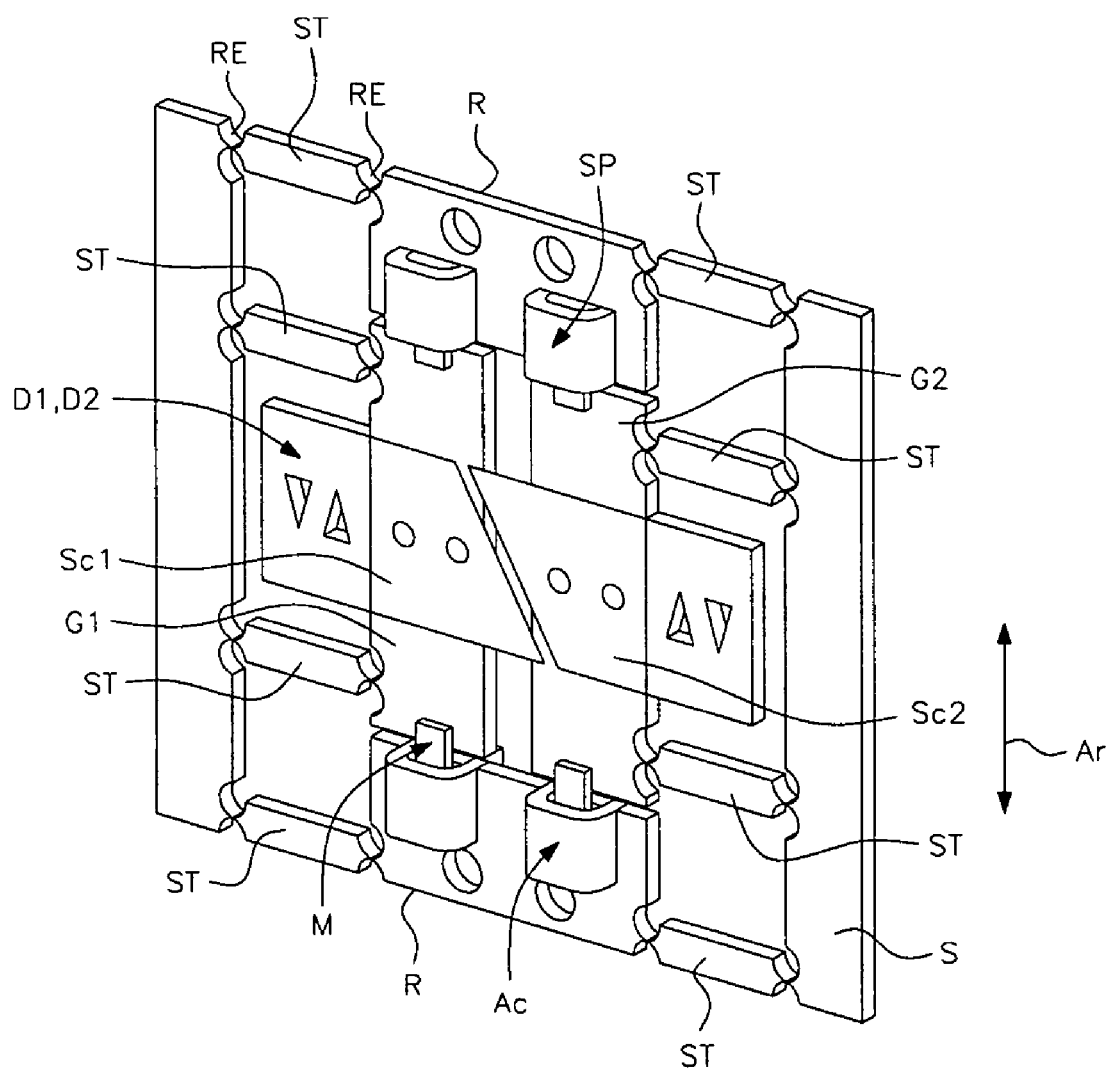
FIG. 1 is a perspective view of the basic design of the invention.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

A planar structure S of the basic component consists of an outer frame R in which narrow elastic webs ST are incorporated, which exhibits recesses RE at their joints in order to keep the junction points small and elastic.

The webs ST hold two elongated inner base plates G1 and G2, on which the two blades Sc1 and Sc2 are fastened with their parallel edges lying opposite to each other. On the base plates G1 and G2, magnets M of an electromagnetic actuator Ac are fixed sideways, which project into an electric coil SP fastened on the frame R.

Through electrical regulation, the magnets move into the coils and cause therewith the movements of the blades Sc1, Sc2 against each other in the direction of the arrow Ar.

The elastic webs ST move perpendicular to their longitudinal direction and are elastic at their joints RE in that direction, while the arrangement perpendicular to the direction of the movement of the blades exhibits a high degree of stiffness.

Figure 3:
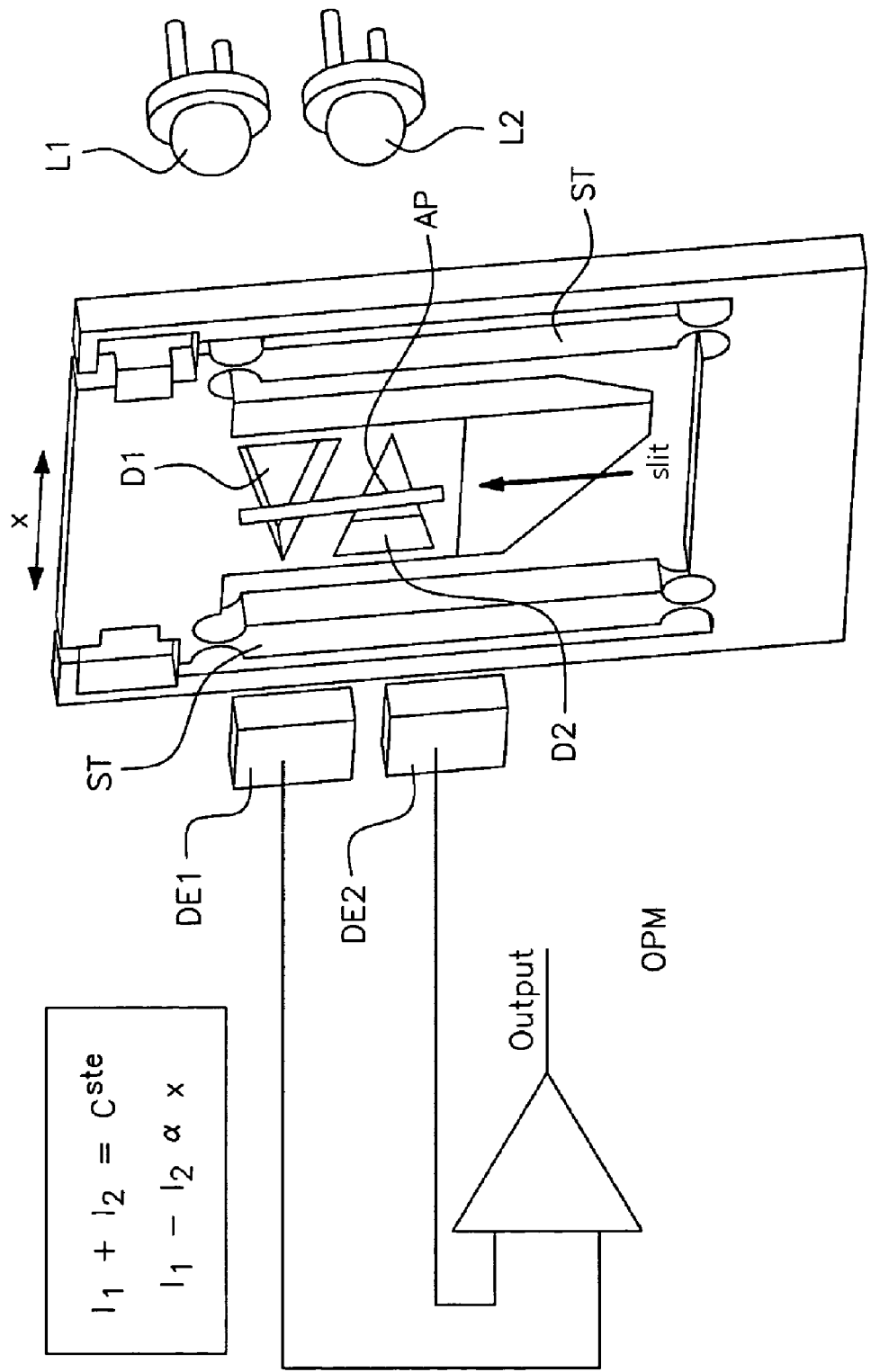
FIG. 3 is a partial perspective/schematic view of the optical measuring system.

With reference to FIG. 3, only the triangles D1 and D2 for each blade of the position control OPM are shown.

If two planar basic modules as in FIG. 1 are joined with each other in such a manner that the blades of both the basic modules shut making an angle with each other, preferably 90 degrees, then by making the corresponding changes in the distance of the blades, a highly precise, variable rectangle, preferably a square, can be formed, which can serve as the pinhole in a laser scanning microscope.

Figure 2:
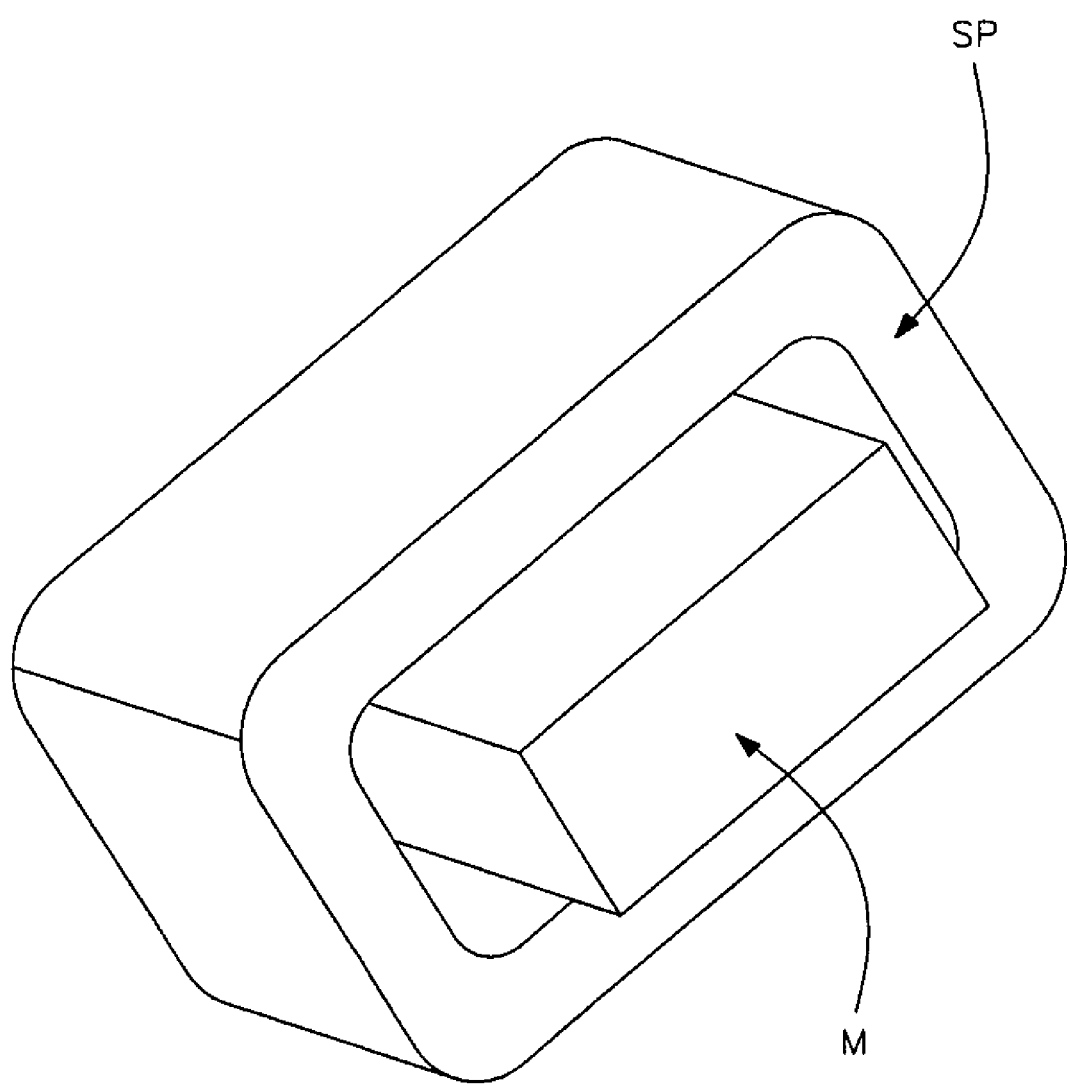
FIG. 2 is a perspective view of the drive.

In FIG. 2, the magnet M and the electrical coil SP of an electromagnetic actuator are shown in an enlarged perspective view.

In FIG. 3, the optical measuring system is shown.

Behind the triangles D1, D2 with mutually opposite orientation, which are arranged in a row perpendicular to the direction of the displacement (arrow), a slit AP, oriented at a right angle to the direction of the displacement is arranged (there can also be two slits), which are illuminated by one, or preferably two, LEDs L1, L2, for each of the triangular aperture.

Due to the movement of the blades, the transmission area of the triangles D1, D2 changes with respect to the slit or the slits AP. This means a change in the quantity of light, which is registered, separately for each triangle, by the two detectors DE1, DE2 located on the other side, opposite the source of light.

The difference in the quantity of light forms the control signal which is proportional to the path of the displacement X, while the sum of the detector signals remains the same and hence ensures that the signal is independent, in first approximation, of the fluctuations in the quantity of light.

Through the registration of the control signals in the X and Y direction, the information about the state of the opening of the pinhole is obtained.

The calibration of the adjustment device can be done by means of external measurements or directly in a laser scanning microscope (LSM).

The position detection element can naturally be also realized by means of other types of non-optical sensors, such as, a capacitive, an inductive, or an electromagnetic sensor, as long as an electrical feedback signal is made available by means of the position detection element.

Figure 4:
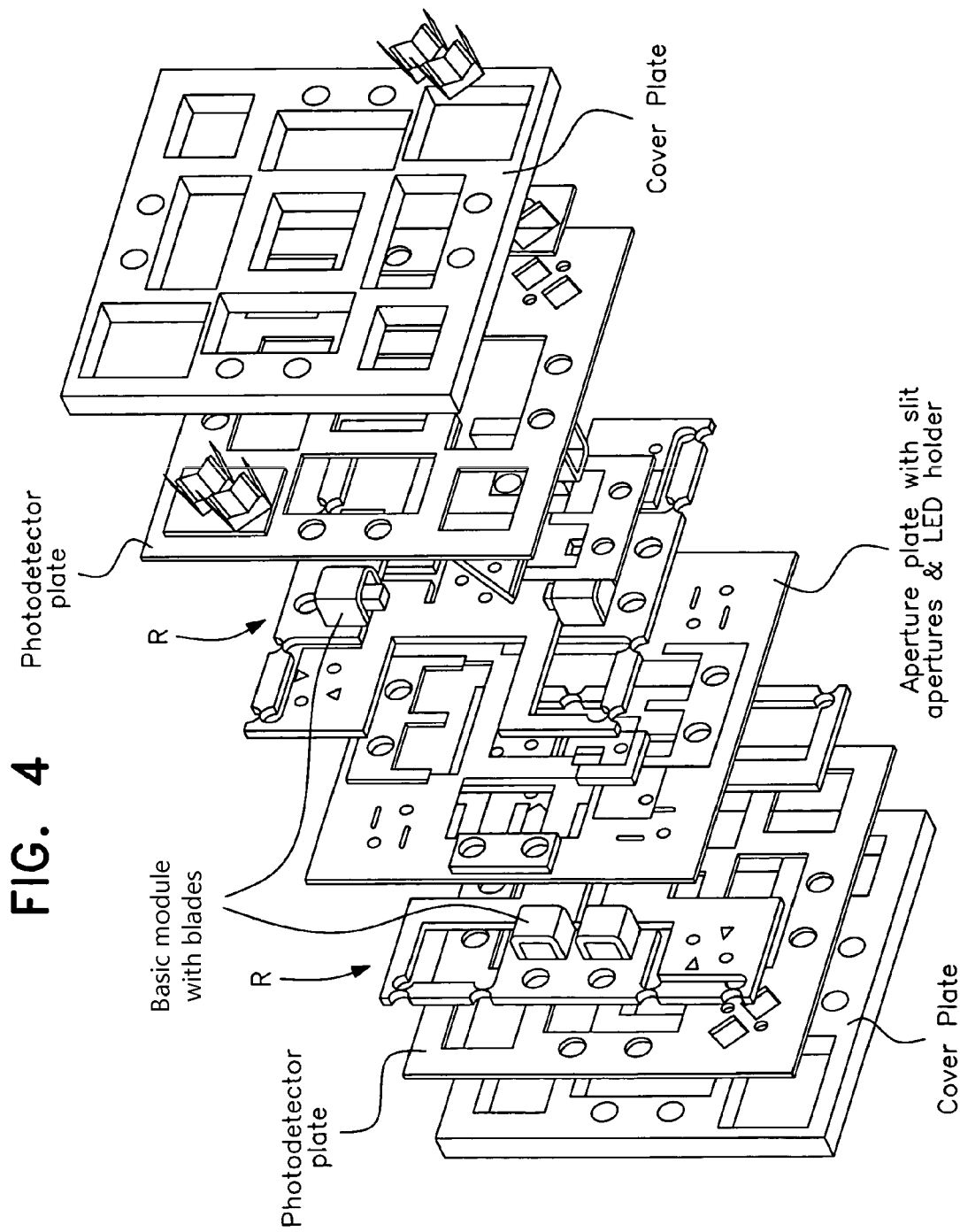
FIG. 4 is an exploded view of the individual components of the inventive pinhole.

In FIG. 4, the individual elements that make up the inventive pinhole are arranged symmetrically about the aperture plate with the slit apertures, and consist of two basic modules with the blades for the mechanical pinhole aperture, photodetector plate for the detection of the quantity of light, and the cover plate for the electronic components and for covering against stray light.

All planar elements are positioned and fixed using pins (not shown).

All elements can be realized by means of diverse types of processing methods using various materials, in particular, metallic materials, ceramic materials, semiconductors and synthetic materials.

It is to be understood that the present invention is not limited to the illustrated embodiments described herein. Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

The invention claimed is:

1. An adjustable pinhole for at least one of the illumination beam path and the detection beam path of a laser scanning microscope, the pinhole comprising at least two spaced-apart, planar basic modules, wherein each basic module includes:
   at least one inner base plate,
   an outer frame
   elastic webs holding the at least one inner base plate to the outer frame at elastic junction points,
   at least one blade mounted on a corresponding inner base plate, the at least one blade being linearly displaceable and having a blade edge having a linear direction of displacement perpendicular to a slit aperture located before or behind the basic module,
   two oppositely-oriented, asymmetric apertures coupled to each blade and positioned relative to the slit aperture to allow passage of beams from at least one light source illuminating the slip aperture, for optically detecting the position of the blade.

2. The pinhole according to claim 1, wherein a basic module includes two mutually displaceable blades, which form a parallel intermediate space with respect to each other.

3. The pinhole according to claim 1, comprising two basic modules, each basic module being provided with two blades, and the direction of the displacement of the blade edges of one of the two basic modules forms an angle of about 90 degrees with respect to the direction of the displacement of the blade edges of the other of the two basic modules.

4. The pinhole according to claim 1, wherein the apertures comprise two triangles with mutually opposite orientation.

5. The pinhole according to claim 1, further comprising electromagnetic actuators for actuating displacement of the at least one blade.

6. The adjustable pinhole according to claim 1, further comprising:
   at least one light source for illuminating the asymmetric apertures;
   an aperture plate arranged symmetrically with respect to the at least two planar basic modules, the slit aperture being arranged in the aperture plate, and
   detector means for separately detecting for each of the asymmetric apertures the quantity of light from the beams passing through the asymmetric apertures.

7. The device according to claim 6, wherein the asymmetric apertures form part of an integrated optical measuring system in a closed control circuit for controlling the position and the opening of the blades.

8. An adjustable pinhole for at least one of the illumination beam path and the detection beam path of a laser scanning microscope, the pinhole comprising at least two spaced-apart, planar basic modules, wherein each basic module includes:
   at least one inner base plate,
   an outer frame,
   elastic webs incorporated with the outer frame and holding the at least one inner base plate to the outer frame, the elastic webs and the outer frame having juncture points therebetween, the juncture points being provided with recesses therein,
   at least one blade mounted on a corresponding inner base plate, the at least one blade being linearly displaceable and having a blade edge having a linear direction of displacement perpendicular to a slit aperture located before or behind the basic module,
   two oppositely-oriented, asymmetric apertures coupled to each blade and positioned relative to the slit aperture to allow passage of beams from at least one light source illuminating the slip aperture, for optically detecting the position of the blade.

* * * * *